United States Patent
Banes et al.

(10) Patent No.: US 7,738,682 B2
(45) Date of Patent: Jun. 15, 2010

(54) TISSUE ENGINEERED CONSTRUCT ANALYTICAL IMAGING SYSTEM AND METHOD OF OBTAINING AND ANALYZING IMAGES OF TISSUE ENGINEERED CONSTRUCTS

(75) Inventors: Albert J. Banes, Hillsborough, NC (US); Melissa Marie Maloney, Carrboro, NC (US)

(73) Assignee: MedTrain Technologies, LLC, Hillsborough, NC (US)

( * ) Notice: Subject to any disclaimer, the term of this patent is extended or adjusted under 35 U.S.C. 154(b) by 227 days.

(21) Appl. No.: 10/576,182

(22) PCT Filed: Oct. 22, 2004

(86) PCT No.: PCT/US2004/035363
§ 371 (c)(1),
(2), (4) Date: Feb. 12, 2007

(87) PCT Pub. No.: WO2005/039396
PCT Pub. Date: May 6, 2005

(65) Prior Publication Data
US 2007/0225597 A1 Sep. 27, 2007

Related U.S. Application Data

(60) Provisional application No. 60/513,355, filed on Oct. 22, 2003.

(51) Int. Cl.
*G06K 9/00* (2006.01)
(52) U.S. Cl. .................. 382/128; 382/286
(58) Field of Classification Search ............... 382/128
See application file for complete search history.

(56) References Cited

U.S. PATENT DOCUMENTS

| 5,106,584 | A * | 4/1992 | Funakubo et al. | 422/65 |
| 6,372,495 | B1 * | 4/2002 | Flendrig | 435/395 |
| 6,416,959 | B1 * | 7/2002 | Giuliano et al. | 435/7.2 |
| 6,449,502 | B1 * | 9/2002 | Ohkubo | 600/407 |
| 6,573,039 | B1 * | 6/2003 | Dunlay et al. | 435/4 |

(Continued)

OTHER PUBLICATIONS

Melissa Maloney et al., "Automated System for Imaging Artificial Tissue Constructs in a Controlled Environment," North Carolina Tissue Engineering Interest Group Meeting, Jun. 20, 2003, Flexcell International Corp., Hillsborough, NC.

(Continued)

*Primary Examiner*—Sath V Perungavoor
(74) *Attorney, Agent, or Firm*—The Webb Law Firm

(57) ABSTRACT

Disclosed is a tissue engineered construct analytical imaging system (10) for use with culture wells (12) having tissue engineered constructs therein, which are positionable in an incubator apparatus (16) or other enclosed environment. The system (10) includes an imaging device (18) in operational communication with the enclosed environment for obtaining data reflective of a well area of interest in the culture well (12), without the removal of the culture well (12) from the enclosed environment. A computer controller (20) can receive data from the imaging device (18), analyze the data and determine desired parameters within the well area of interest and/or output data reflective of the results of the analysis. A computer-implemented method of obtaining and analyzing images of tissue engineered constructs is also disclosed.

33 Claims, 22 Drawing Sheets

U.S. PATENT DOCUMENTS

| | | | |
|---|---|---|---|
| 6,721,667 B2 * | 4/2004 | Banes et al. | 702/41 |
| 6,881,584 B1 * | 4/2005 | Lenhard et al. | 436/147 |
| 6,902,883 B2 * | 6/2005 | Dunlay et al. | 435/4 |
| 2001/0046689 A1 * | 11/2001 | Yahiro | 435/29 |
| 2003/0064358 A1 * | 4/2003 | Elson et al. | 435/4 |
| 2003/0182069 A1 * | 9/2003 | Banes et al. | 702/33 |
| 2007/0219769 A1 * | 9/2007 | Herzog et al. | 703/11 |
| 2007/0225597 A1 * | 9/2007 | Banes et al. | 600/425 |

OTHER PUBLICATIONS

Joanne Garvin et al., "Novel System for Engineering Bioartificial Tendons and Application of Mechanical Load," Tissue Engineering, vol. 9, No. 5, 2003, pp. 967-979, Mary Ann Liebert, Inc.

Ioannis K. Triantafillopoulos et al., "Nandrolone Decanoate and Load Increase Remodeling sand Strength in Human Supraspinatus Bioartificial Tendons," The American Journal of Sports Medicine, (2004) vol. 32, No. 4, pp. 934-943, American Orthopedic Society for Sports Medicine.

* cited by examiner

TISSUE ENGINEERED CONSTRUCT ANALYTICAL IMAGING SYSTEM AND METHOD OF OBTAINING AND ANALYZING IMAGES OF TISSUE ENGINEERED CONSTRUCTS

BACKGROUND OF THE INVENTION

1. Field of the Invention

The present invention relates generally to systems and methods for automated analysis and imaging of tissue engineered constructs, such as genetic material, bioartificial tissue; bioartificial tendons and the like, and in particular to a system and computer-implemented method for imaging and analyzing tissue constructs in a controlled environment in the field of tissue engineering and cell biology.

2. Description of Related Art

In the field of tissue engineering, bioartificial tissue (BAT) cellular constructs, such as bioartificial tendons, are analyzed for various parameters, such as response to loading, response to foreign substances, compaction of matrix and alteration of properties, etc. For example, when analyzing bioartificial tendons, partial samples of human supraspinatus tendons are harvested from debrided tissue of patients undergoing open or arthroscopic surgical repair of injured tendons. These harvested samples, and in particular the supraspinatus tendon cells, are isolated from the specimens, minced into small pieces and rinsed with a nutrient to remove red blood cells.

Next, these minced tendons are digested with a collagenase in a specified medium, together with antibiotics and buffering agents. Cells that are cultured in three-dimensional collagen gels express a more native state phenotype, since these cells form a syncytial network that is capable of being mechanically loaded. In addition, these types of cells remodel their matrix by eliminating water, reorganizing and aligning the collagen fibrils. Still further, the ability of these cells to withstand mechanical loading in a native matrix provides additional research data. Specifically, in tissues, these cells are capable of bearing strains and altering the expression profile consistent with immobilization, moderate activity or repetitive loading.

In order to create bioartificial tissue or BAT units, the cell-matrix mixture is dispensed into a trough of defined geometry, in a membrane in a culture plate or culture well by drawing the flexible membrane into a trough in a Delrin disc with vacuum holes placed in the disc. After vacuum is applied to the flexible well bottom, the membrane is drawn downward into the cavity of the disc. Flexible but inelastic nylon mesh anchors are bonded to the membrane at predetermined poles, and anchor stems at each end of the nylon mesh anchors connect to a cell-gel material that is transferred into each well. The anchor stems allow the bonding thereto of the collagen gel and cell mixture. The vacuum is released after gelation and the cell-gel construct returns to the horizontal plane of the flexible membrane.

When it is desired to mechanically load these BATs, such mechanical loading may be achieved by placing an arctangle loading post beneath each well, for example, in a six-well culture plate, and using a vacuum to displace the flexible membrane downward. This results in a uniaxial strain on the BAT. Accordingly, cells may be cultured in a mechanically active and three-dimensional culture environment, which is particularly useful in the field of tissue engineering.

In analyzing these three-dimensional cell-matrix constructs, it is beneficial to conduct this analysis over time in a study. Typically, the cells within these constructs will begin to form attachments immediately, i.e., on the day of plating, and will subsequently reorganize and contract the matrix within a few hours to days. Accordingly, measurements of the matrix contraction under the influence of various physical and biochemical factors indicate the impact of each factor on the cellular function.

According to the prior art and with respect to tissue, engineered constructs, and genetic material generally, measurements of matrix compaction, organization, contraction and other parameters are performed manually by periodically removing the culture plates from the controlled environment, e.g., inside an incubator apparatus, to access an external imaging device, such as a camera or a scanner. Depending upon the effect of being measured, this process may need to be repeated every few hours, day and night, for several days. Not only is such a process labor intensive, it also leads to damaging influences for the cell cultures themselves. Accordingly, it is preferable to analyze and monitor these constructs, without repeatedly exposing these constructs to dramatic environmental changes.

SUMMARY OF THE INVENTION

It is, accordingly, an object of the present invention to provide a tissue engineered construct analytical imaging system that overcomes the deficiencies in the prior art. It is another object of the present invention to provide a computer-implemented method of obtaining and analyzing images as an outcome measure of the progress of development of a tissue engineered construct that also overcomes the deficiencies of the prior art. It is a still further object of the present invention to provide a system and method for analyzing and imaging tissue engineered constructs that offers an automated process for imaging and outcome analyses. It is a still further object of the present invention to provide a method and system for analyzing and imaging tissue engineered constructs that limits the contact of the tissue construct to various environmental changes. It is yet another object of the present invention to provide a method and system for analyzing and imaging tissue engineered constructs that allows the imaging process to occur while the tissue engineered construct remains positioned in the cultural well within an enclosed environment.

Accordingly, the present invention is directed to a tissue engineered construct analytical imaging system. The system is for use in connection with one, and typically multiple, culture wells that have a tissue engineered construct, such as bioartificial tissue, positioned therein. These wells are positionable in an enclosed environment, such as an incubator apparatus. The system includes an imaging device in operational communication with the enclosed environment for obtaining data reflective of a well area of interest in the culture well. In addition, this data is obtained without the removal of the culture well from the enclosed environment. The system also includes a computer controller that is capable of receiving data from the imaging device, analyzing the data for determining one or more desired parameters within the well area of interest and/or outputting data reflecting the results of this analysis. The imaging device may be a camera, a digital camera, a scanner, a scanning device, multiple cameras, a video camera, a digital video camera, a device capable of capturing an image, etc. In one embodiment, the imaging device is a scanner positioned within the enclosed environment.

The present invention is also directed to a computer-implemented method of obtaining and analyzing images of tissue engineered constructs. This method includes the steps of: (a) positioning at least one culture well having the tissue engineered construct therein in an enclosed environment; and (b)

obtaining data reflective of a well area of interest in the culture well, without the need to remove the culture well from the enclosed environment.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
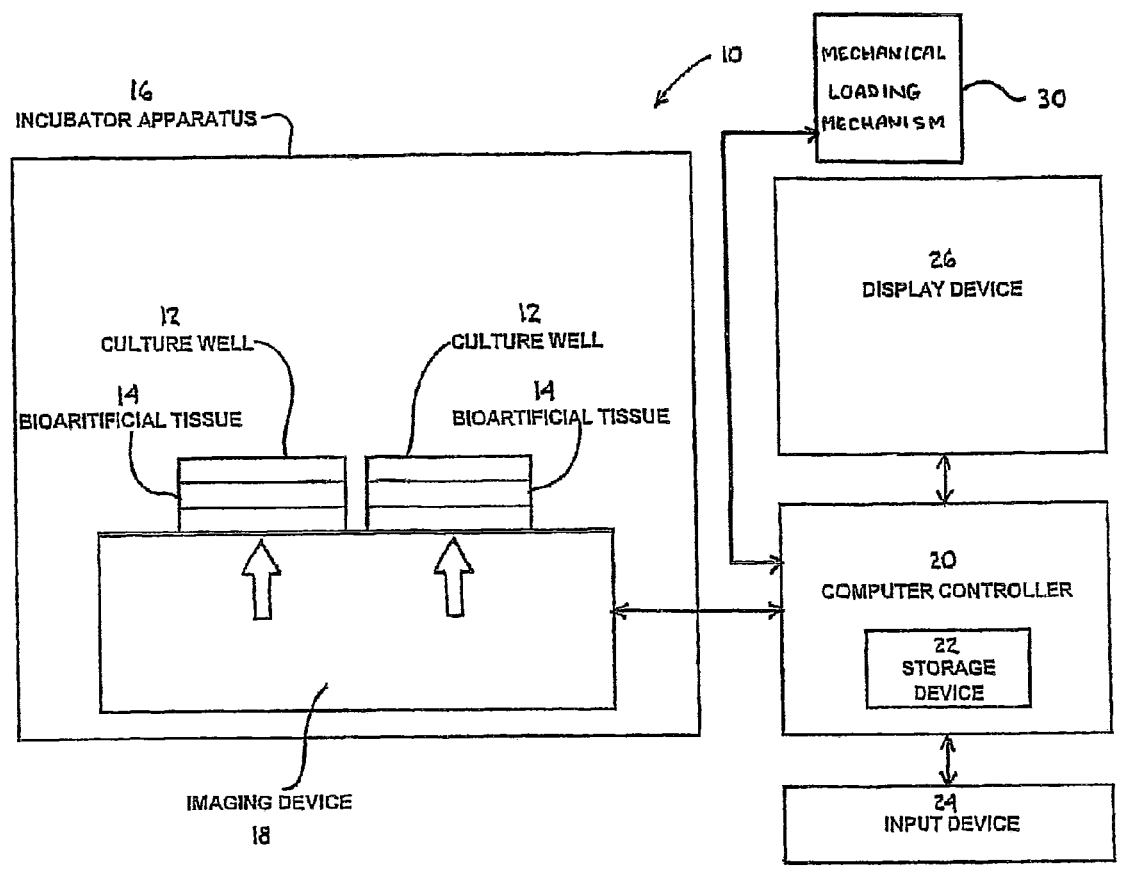
FIG. 1 is a schematic view of one embodiment of a tissue engineered construct analytical imaging system according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is a tissue engineered construct analytical imaging system 10, as illustrated in schematic form in FIG. 1. In addition, the present invention is also directed to a computer-implemented method of obtaining and analyzing images of tissue engineered constructs. One preferred and non-limiting embodiment of this computer-implemented method is illustrated as various screen shots and, in the form of an executable program, in FIGS. 2-21. In one embodiment, the computer-implemented method is in the form of an executable software program, preferably having a Graphical User Interface (GUI). The user interfaces with the GUI and interacts with the method and system 10 of the present invention. It is envisioned that the software of the present invention may also interact with or execute using other enabling and/or proprietary software, such as LabVIEW™ by National Instruments.

As discussed hereinafter, the tissue engineered construct used in the exemplary embodiments of the system 10 and method is bioartificial tissue 14. However, it is envisioned that the system 10 and method are equally useful in connection with any tissue engineered construct that can be cultured in an enclosed environment, such as genetic material, tissue, bioartificial tissue, bioartificial tendon, cellular material, organic material, etc. With reference to one embodiment of the tissue engineered construct analytical imaging system 10 according to the present invention, and as illustrated in FIG. 1, this system 10 is specifically for use in connection with one or more culture wells 12 having a tissue engineered construct, such as bioartificial tissue 14, positioned within or otherwise situated in the well 12. These culture wells 12 are, in turn, positionable in an enclosed environment, such as an incubator apparatus 16. In one embodiment, each culture well 12 is located in a six-well culture plate, which includes four plates per base plate. Accordingly, in one embodiment, the system 10 and computer-implemented method are used to analyze and image twenty-four test subjects of bioartificial tissue 14. Of course, the system 10 and computer-implemented method are equally effective with only a single culture well 12 or a large quantity of culture wells 12.

In one embodiment, the system 10 includes an imaging device 18, which is in operable communication with the incubator apparatus 16. The imaging device 18 obtains data that is reflective of a well area of interest in the culture well 12. Importantly, the imaging device 18 is able to obtain or capture this data without the requirement of removing the culture well 12 from the incubator apparatus 16. The imaging device 18 may be positioned within the incubator apparatus 16, adjacent the incubator apparatus 16 or otherwise with a line-of-sight to the incubator apparatus 16, such that the well 12, and the bioartificial tissue 14 therein, is capable of being monitored. The position of the imaging device 18 is such that it can collect and obtain data reflective of a culture well 12 area of interest without requiring the removal of the culture well 12 from the incubator apparatus 16 or other enclosed area or environment.

The system 10 also includes a computer controller 20. The computer controller 20 has many different functions that allow for the automated control of the system 10. For example, the computer controller 20 can receive data from the imaging apparatus 18, analyze that data for determining one or more desired parameters within the culture well 12 or culture well area of interest, output data reflecting the results of such an analysis, control the various components and subcomponents of the system 10 and perform other automated functions related thereto.

The imaging device 18 may be any suitable imaging device 18 used to collect and obtain data from the culture well 12. For example, the imaging device 18 may be a camera, a digital camera, a scanner, a scanning device, a plurality of cameras, a video camera, a digital video camera, a device capable of capturing image, etc. Further, with respect to the computer controller 20, any suitable computer is envisioned. For example, the computer controller 20 may be a computing device, a computer, a personal computer, a controller, a circuit board, a laptop, a personal digital assistant, a networked computer, a server, etc.

While the computer controller 20 may be used to control the components and subcomponents of the system 10, it is also envisioned that the computer controller 20 also be configured to control a mechanical loading means or mechanism 30 for loading the bioartificial tissue 14 in the culture well 12. Accordingly, the mechanical loading mechanism 30 would not require a separate control device, and now would the system 10 of the present invention. Therefore, the computer controller 20, as discussed in more detail herein, could be used as a central control mechanism for not only the system 10 but ancillary systems and additional testing, monitoring and analytical systems.

In one embodiment, the culture wells 12 are positionable upon the imaging device 18. In this embodiment, the imaging device 18 would be a scanner having a transparent scanning surface, as is known in the art. The culture wells 12 would be positioned directly on the transparent scanning surface, and the imaging device 18 (the scanner) would capture a digital image of the bioartificial tissue 14 through the bottom of the culture well 12. Therefore, it is envisioned that the well area of interest would also include the bioartificial tissue 14 in the culture well 12.

Using the above-described system 10, a user can operate the computer controller 20, which, in turn, controls the imaging device 18. In particular, the imaging device 18 would be able to collect appropriate data regarding the culture well 12 and the bioartificial tissue 14 while the culture well 12 or wells 12 are positioned in the incubator apparatus 16. Further, additional receipt, analysis and output regarding this data is accomplished using the computer controller 20.

In another embodiment, the system 10 includes a storage device 22 in communication with the computer controller 20. The storage device 22 is capable of storing data, image data, well culture data, well area of interest data, construct area of interest data, incubator data, parameter data, digital input data, analog input data, etc. In addition, the system 10 can include an input device 24, which is also in communication with the computer controller 20, the input device 24 is used to transmit user input commands to the computer controller 20. Still further, the present invention includes a display device 26 in communication with the computer controller 20. The display device 26 is capable of displaying data, image data, well culture data, well area of interest data, construct area of interest data, incubator data, parameter data, digital input data, analog input data, user input data, graphical data, analytical results, images, etc. It is envisioned that the display device 26 may also display data that is stored on the storage device 22. In addition, and as is known in the art, the display device 26 may be a computer monitor.

It is envisioned that the system 10 and computer-implemented method of the present invention could be used in connection with any monitoring and analysis of cultured construct in an enclosed environment. For example, the tissue engineered construct may be bioartificial tissue, which may be cells cultured in a three-dimensional collagen gel. This bioartificial tissue 14 may be anchored within the culture well 12 on at least two ends thereof, as is known in the art. However, the system 10 and computer-implemented method of the present invention is equally useful in connection with a variety of cellular and genetic modelling, monitoring and analytical systems and applications.

As discussed above, the computer-implemented method and functioning of the computer controller 20 may be in the form of an executable program installed on the computer controller 20. In this manner, a user would be permitted to interact with the computer controller 20 and input and receive data therefrom. In one embodiment, the data obtained regarding the culture well 12 and/or culture well area of interest is a digital image obtained by a digital imaging device 18, such as a scanner or the like. However, this data may be obtained from a variety of imaging devices 18 capable of collecting a variety of data, such as imaging data, visual data, visible light data, infrared data, ultraviolet data, magnetic resonance engineering data, computer tomography data, radiation data, x-ray data, etc. Further, the imaging device 18 may be capable of collecting data in both a two-dimensional and three-dimensional format.

Turning to the computer-implemented method of the present invention, which is illustrated by a series of screen shots in one preferred and non-limiting embodiment, the method allows for the capture and analysis of images of the bioartificial tissue 14. Once the culture wells 12 are positioned in the incubator apparatus 16 (or similar enclosed environment), specified data is obtained. In particular, data that is reflective of a well area of interest within the culture well 12 is captured, typically by an imaging device 18. This data can be received, analyzed for a desired parameter, and thereafter, result data may be output reflecting the results of such an analysis. As discussed above, in one embodiment, the culture well 12 and the well area of interest include bioartificial tissue therein. Accordingly, a mechanical loading device (not shown) can be controlled and otherwise provide for the controlled loading of the bioartificial tissue 14.

When in the form of a GUI in an executable program, the user and/or the computer controller 20 can expand, contract, manipulate and otherwise modify the well area of interest. The imaging device 18 then obtains data that reflects the well area of interest, and when multiple culture wells 12 are positioned in the incubator apparatus 16, the imaging device 18 can collect data on all of these well areas of interest. Still further, the data collected regarding the well 12 or wells 12 is captured at specified and/or selectable points in time and for specified or selectable capture periods. For example, the user may specify that the imaging device 18 should capture data or, in a preferred embodiment, digitally image, one or more of the culture wells 12 every eight hours for a 48-hour period. Further, the user may specify how long the capture period should be, as well as the resolution of the image captured.

In one embodiment, data is obtained that is reflective of multiple well areas of interest for a respective multiple culture wells 12 positioned within the incubator apparatus 16 (or other enclosed environment). In this embodiment, a well default area of interest, including a construct area of interest therein, is identified. Based upon the data reflective of the user-selected default area of interest, as well as the construct area of interest therein, the method is capable of identifying subsequent construct areas of interest in the other well areas of interest in the subsequent culture wells 12. This means that, once the computer controller 20 "learns" what to look for, namely the construct area of interest and/or the bioartificial tissue 14 in the well 12, the computer controller 20 is capable of identifying similar or substantially similar tissue areas of interest and/or bioartificial tissues 14 and subsequent wells 12. Once the computer controller 20 has so identified the subsequent tissue areas of interest, a visual indication of such identification may appear on an image or within the data and on the display device 26.

Once the method and computer controller 20 have identified the relevant construct areas of interest in the culture wells 12, and based upon the selected image cycle and capture period, the imaging device 18 can automatically capture additional and relevant images of the bioartificial tissue 14 on an ongoing and automated basis. This data is stored on the storage device 22, and may be displayed in various forms on the display device 26.

One problem that may arise with certain imaging devices 18 is the production of glare in the image data or digital image captured by the imaging device 18. Such glare or other anomalies, such as well contaminants, in the image may cause the computer controller 20 to misidentify or not identify subsequent bioartificial tissue 14 and/or construct areas of interest in the initial or subsequent culture wells 12. Therefore, the present computer-implemented method allows the user to manipulate the well area of interest and/or the construct area of interest for use in further data collection for the culture wells 12. This means that the user can redefine the limits of what the imaging device 18 is "looking at". Accordingly, the user can serve as a check-and-balance to the data obtained by the imaging device 18. Therefore, the user may select or otherwise modify, via the computer controller 20, the well area of interest, construct area of interest, etc. This provides the system 10 and computer-implemented method of the present invention with a greater degree of accuracy, as well as the ability to remove and/or account for imaging problems.

The user may uniquely identify a culture well 12 within the culture wells 12 in the incubator apparatus 16. As discussed above, in one embodiment, there are six wells 12 in a plate and four plates in a base plate, resulting in twenty-four culture wells 12 and twenty-four discrete test subjects of bioartificial tissue 14. The user may uniquely identify the culture well 12 or modify this identity according to his or her needs. Still further, the user may group various wells 12 together or otherwise manipulate the data, such that test groups can be formed.

In one embodiment, where the well area of interest includes the construct area of interest, the desired parameter that is analyzed and calculated is the area of the bioartificial tissue 14 in the construct area of interest. In order to display what the computer controller 20 deems as the bioartificial tissue 14 in the culture well 12, the computer controller 20 may display a digital image of the culture well 12 with an overlaid image using computer graphical incremental pixels. In this manner, the user can readily identify just what the computer controller 20 considers to be the bioartificial tissue 14 in the well 12. Based upon this data, the computer controller 20 calculates the area of the bioartificial tissue 14 in the well 12. As discussed above, when a digital image is captured of a particular well 12 over a period of time or at set increments, a data set is formed of the changing bioartificial tissue 14 in the well 12. Therefore, the computer controller 20 is capable of calculating the increase or decrease in area of the bioartificial tissue 14 over time.

It is also envisioned that this area may be plotted, specifically as the area of bioartificial tissue 14 versus time, and the resulting plot may be displayed to the user on the display device 26. Since the contraction of the bioartificial tissue 14 is a manifestation of the cells in the collagen gel matrix reorganizing the matrix and eliminating water from the gel, it is expected that the area will decrease dramatically over time, for example from a rectangular to an hourglass shape in a thin cord-like structure. Since the user is capable of viewing the raw data, the user may identify certain anomalies in the data that are correctable. For example, if the computer controller 20 determines the area of the bioartificial tissue 14 to include a glare spot or other contamination, as discussed above, the user and/or the computer controller 20 may redefine the line-of-sight, well area of interest and/or construct area of interest to eliminate the improper accounting. Of course, it is envisioned that the computer controller 20 can be trained to remove these glare spots, contaminations, etc. in subsequent culture wells 12 based upon this data. This makes the system 10 and computer-implemented method robust, in that the system 10 is capable of learning and refining the identification and imaging processes.

EXAMPLE

Figure 2:
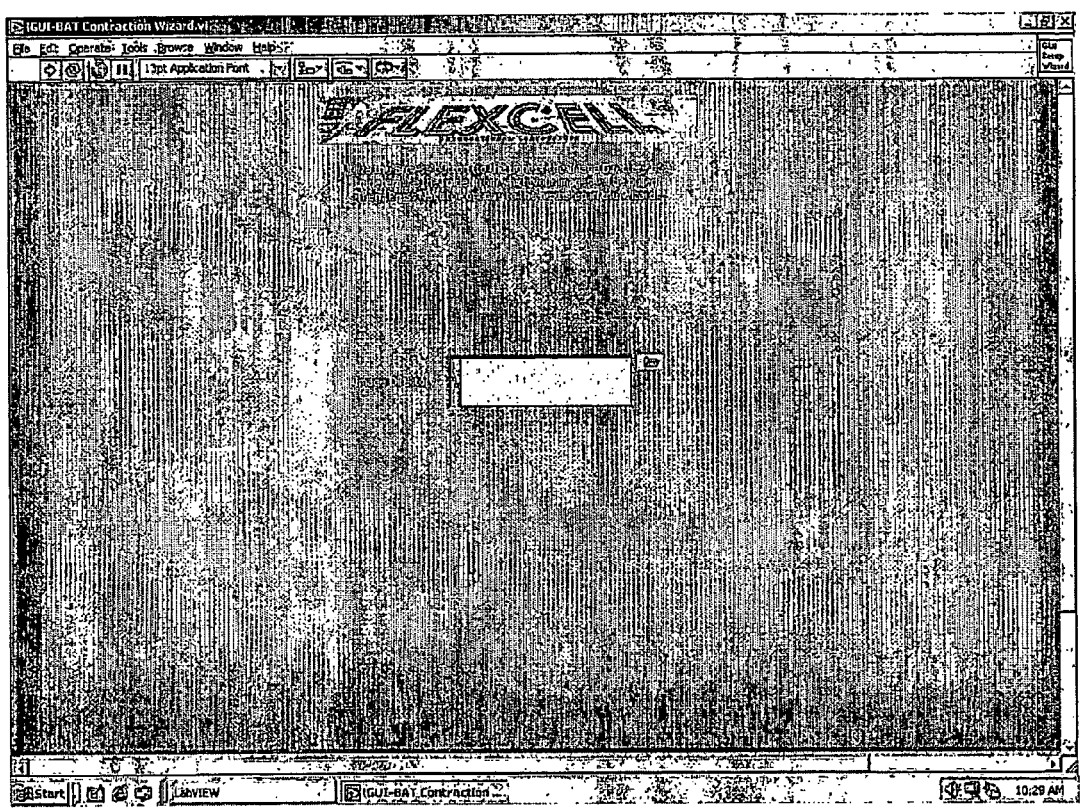
FIG. 2 is a screen shot of one step in a computer-implemented method of obtaining and analyzing images of tissue engineered constructs according to the present invention, the screen shot illustrating one preferred and non-limiting embodiment of this method.
Figure 3:
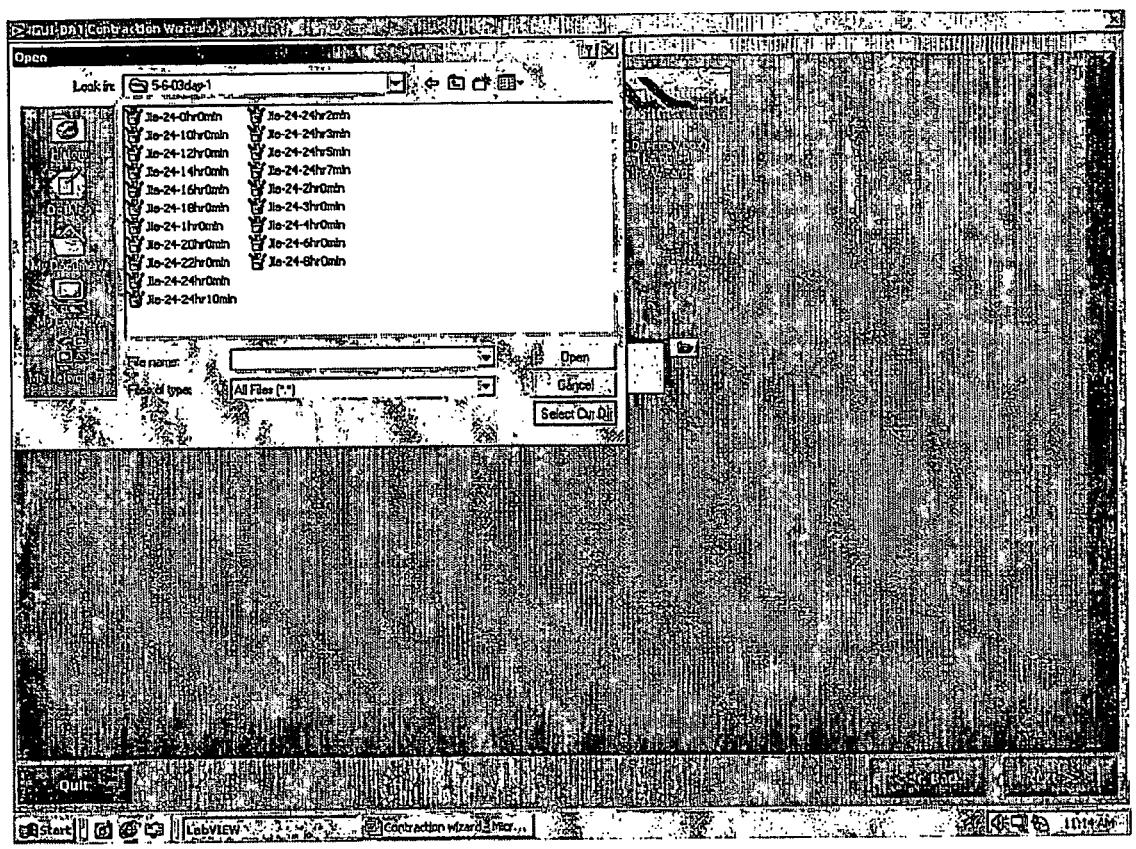
FIG. 3 is a screen shot of a further step in a computer-implemented method of obtaining and analyzing images of tissue engineered constructs according to the present invention, the screen shot illustrating one preferred and non-limiting embodiment of this method.
Figure 4:
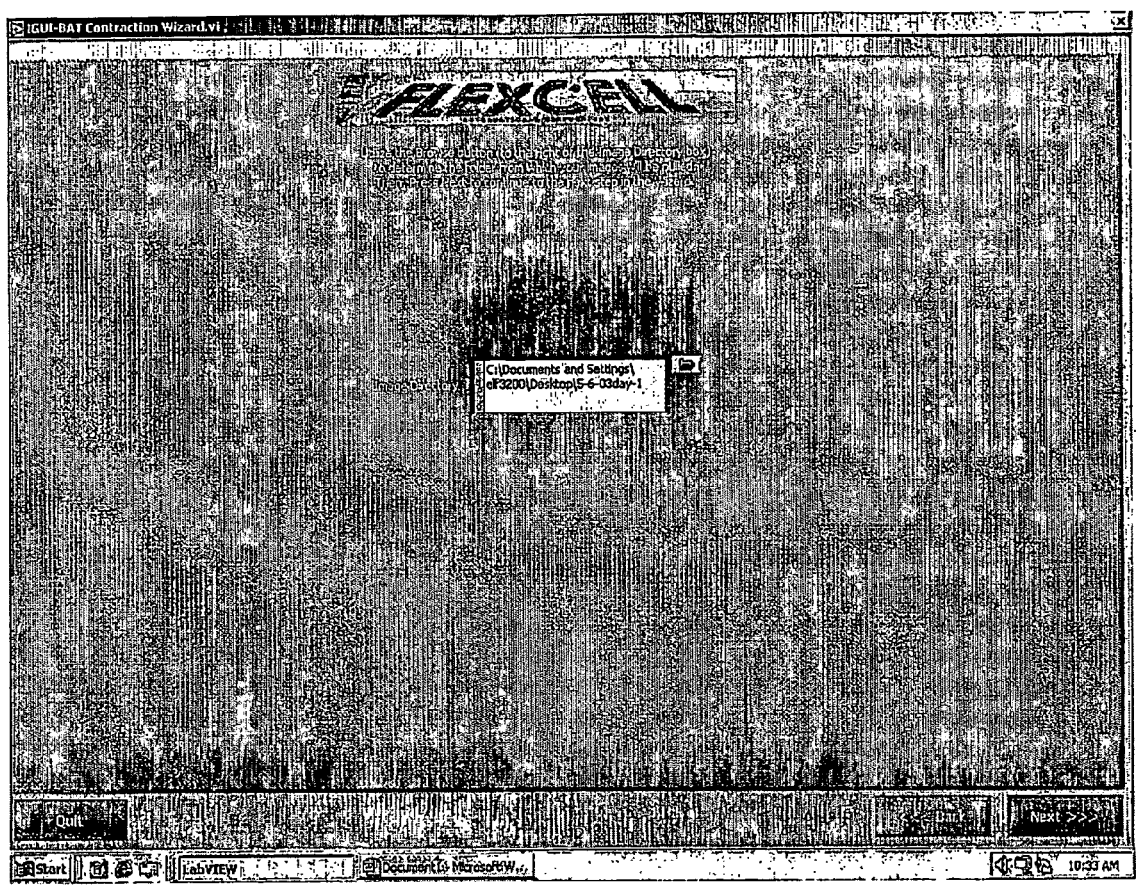
FIG. 4 is a screen shot of a further step in a computer-implemented method of obtaining and analyzing images of tissue engineered constructs according to the present invention, the screen shot illustrating one preferred and non-limiting embodiment of this method.

One example of the system 10 and computer-implemented method of the present invention is illustrated by means of various screen shots in FIGS. 2-22. In FIG. 2, the software program is executed, and in this example, imaging of various three-dimensional cell-gel constructs have been conducted over some time course. In FIG. 2, the user is allowed to select the image directory in order to search for the appropriate images. The image directory/folder containing the images is identified, and the image directory in FIG. 3 was set to a directory containing files with scanned pictures from a conducted experiment. See FIG. 4.

Figure 5:
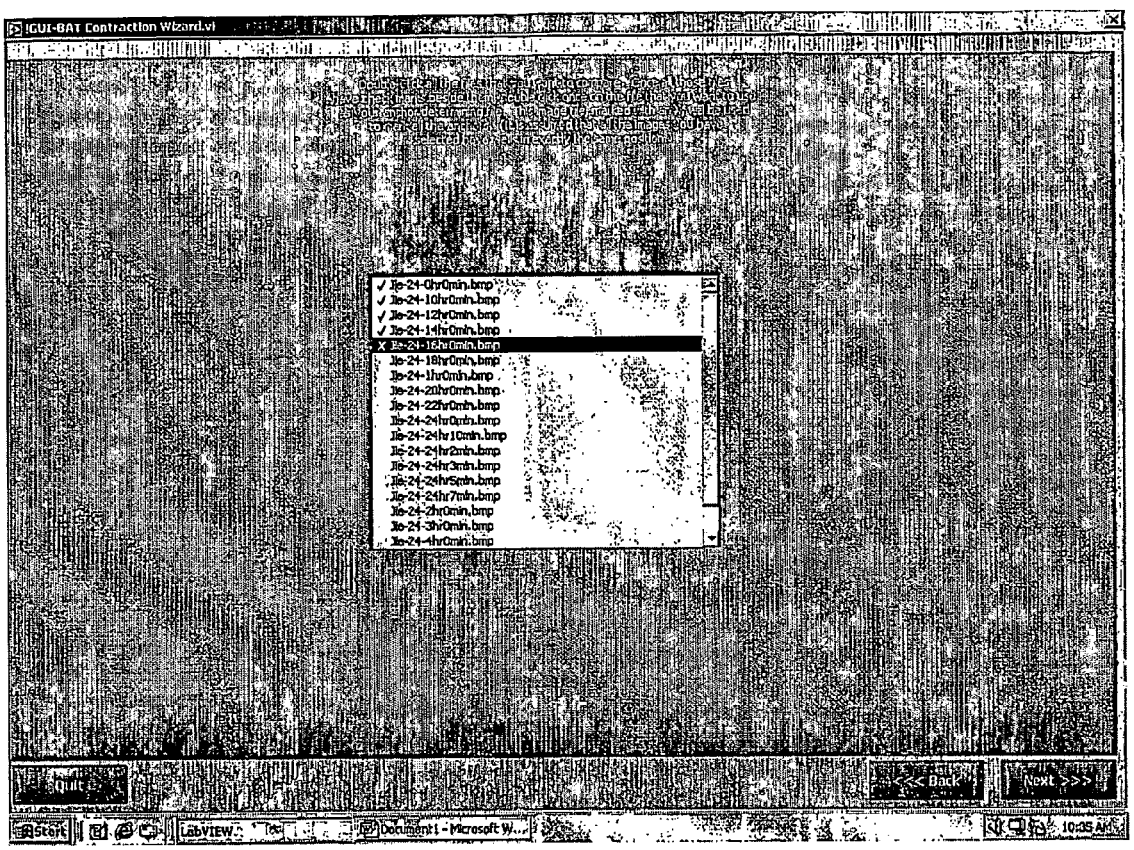
FIG. 5 is a screen shot of a further step in a computer-implemented method of obtaining and analyzing images of tissue engineered constructs according to the present invention, the screen shot illustrating one preferred and non-limiting embodiment of this method.
Figure 6:
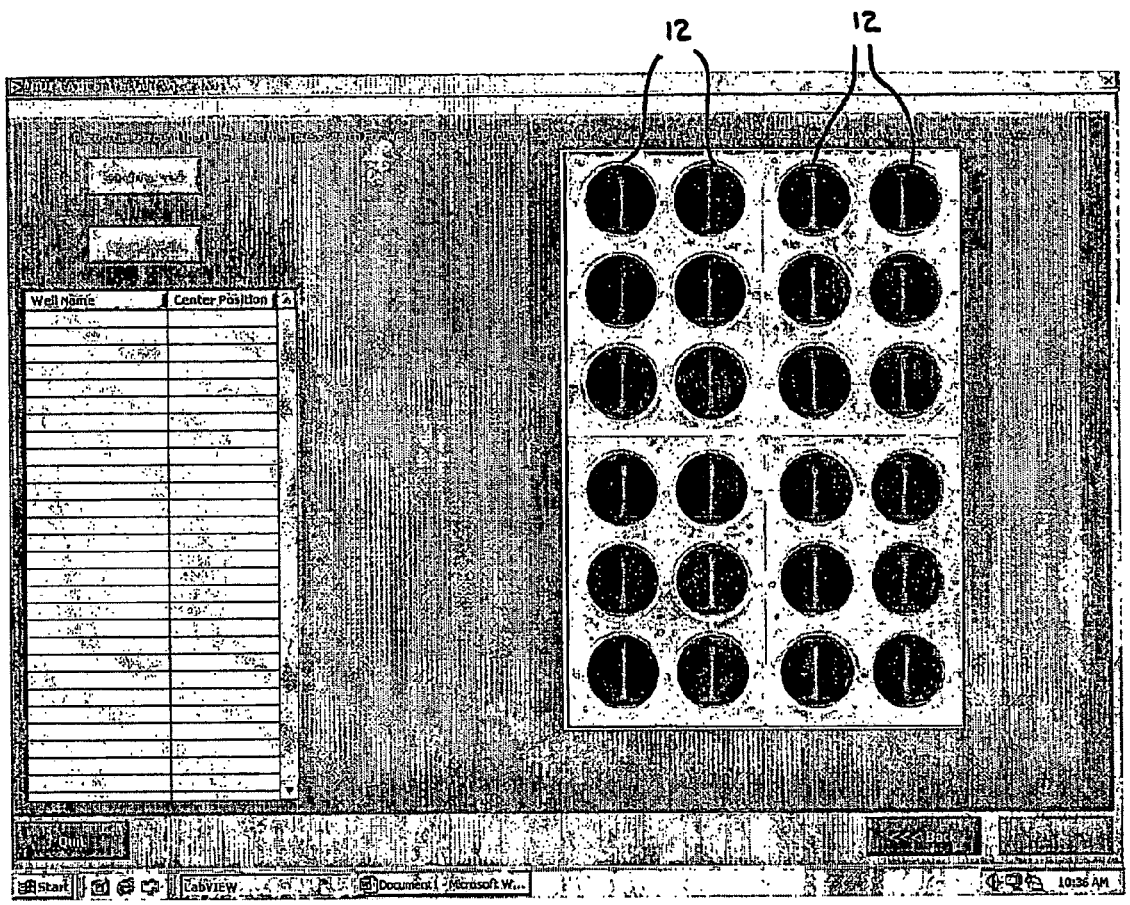
FIG. 6 is a screen shot of a further step in a computer-implemented method of obtaining and analyzing images of tissue engineered constructs according to the present invention, the screen shot illustrating one preferred and non-limiting embodiment of this method.

In FIG. 5, various images are selected, and these images are selected by double clicking by the file name. By double clicking twice, an image file is selected, which is used to mark all of the well 12 images. As seen in the example in FIG. 5, it has been determined to measure the bioartificial tissue 14 for the times 0, 10, 12, 14 and 16 hours using the 16-hour file to mark the bioartificial tissues 14. In FIG. 6, the image of the wells 12 is displayed, and an image in the upper left well will be used to identify the bioartificial tissue 14 in the remaining wells 12. Of course, it is envisioned that the user can manually check each well for the fidelity of the automated recognition and identification processes. See FIG. 6.

Figure 7:
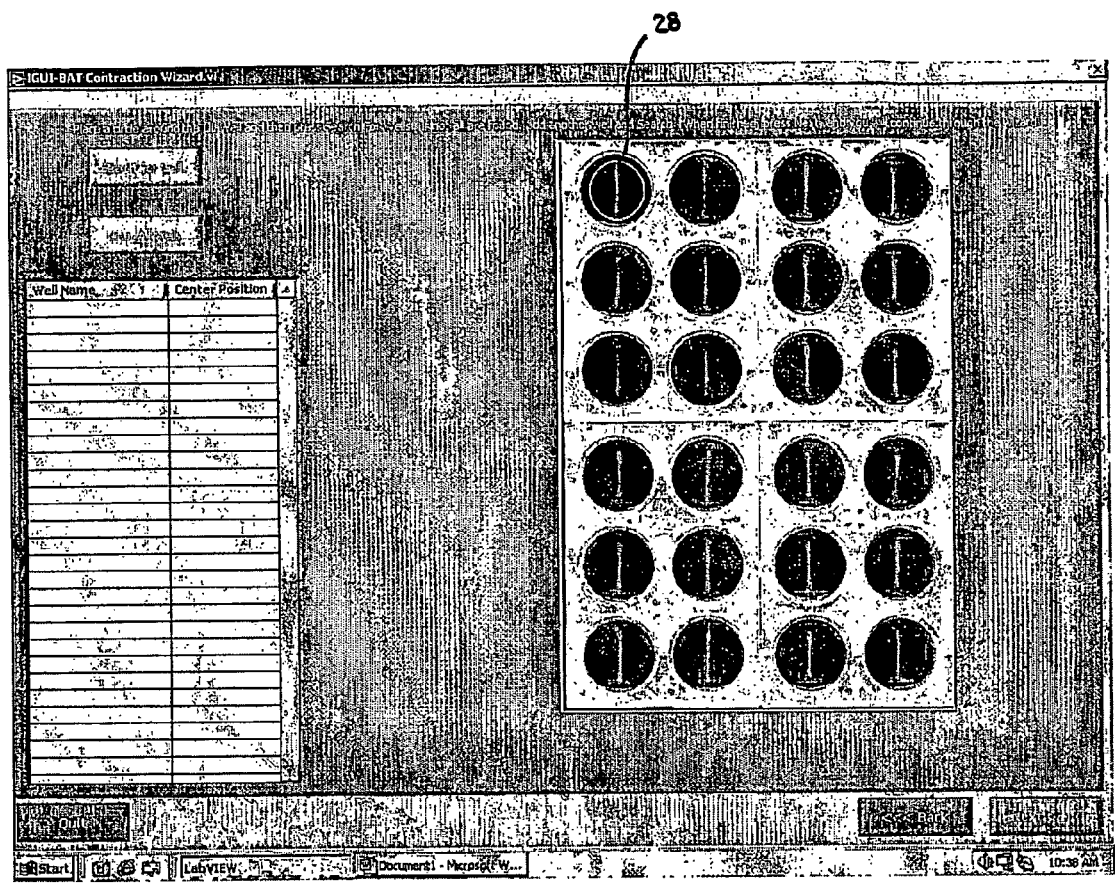
FIG. 7 is a screen shot of a further step in a computer-implemented method of obtaining and analyzing images of tissue engineered constructs according to the present invention, the screen shot illustrating one preferred and non-limiting embodiment of this method.
Figure 8:
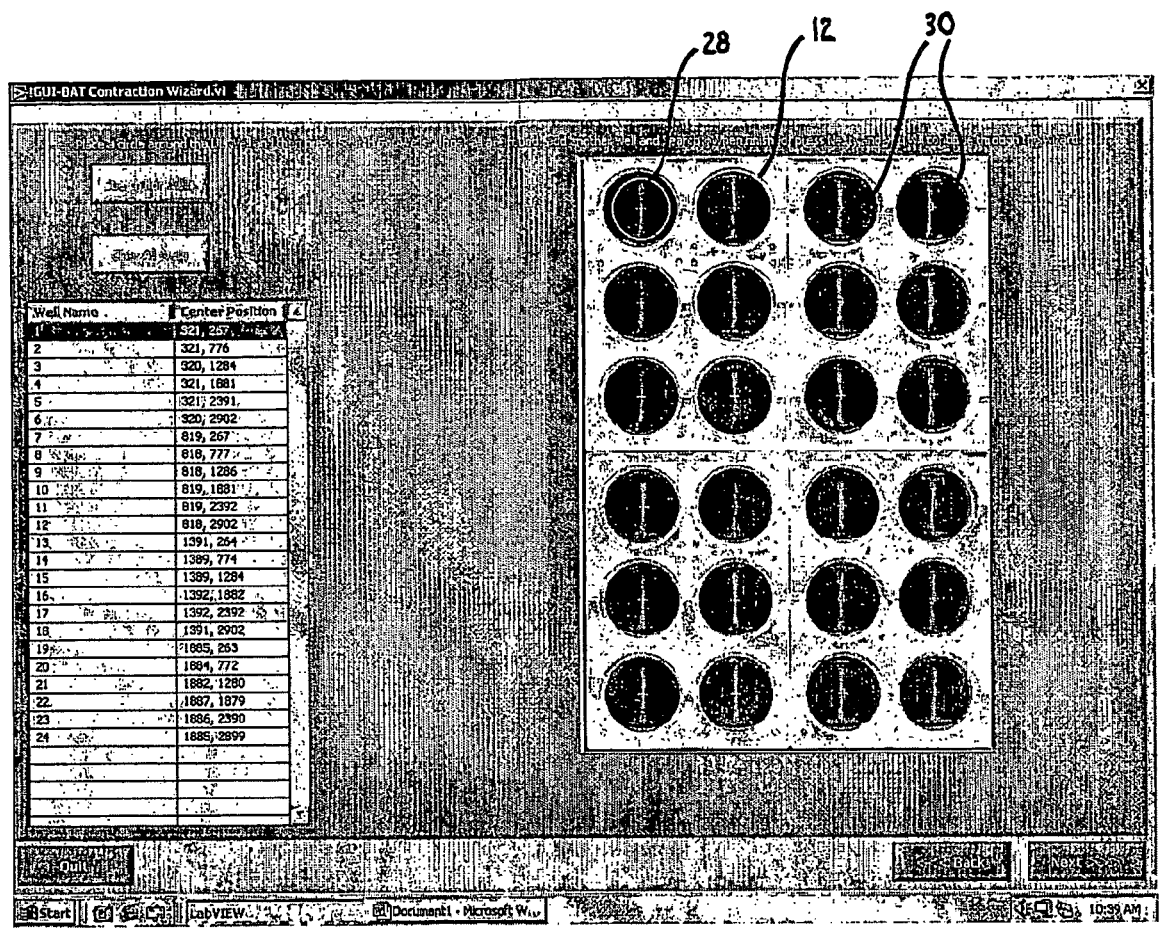
FIG. 8 is a screen shot of a further step in a computer-implemented method of obtaining and analyzing images of tissue engineered constructs according to the present invention, the screen shot illustrating one preferred and non-limiting embodiment of this method.

In FIG. 7, the user is provided with an expandable, graphical circle with which to define the well area of interest 28. In this example, the upper left well 12 is chosen, and the well area of interest 28 extends to the ends of the bioartificial tissue 14, which is anchored to either side of the well 12. FIG. 7 also illustrates the computer controller 20 automatically identifying the existence of bioartificial tissue 14 in the subsequent wells 12. In this example, a "+" symbol indicates that the computer controller 20 has appropriately identified a bioartificial tissue 14 in the well 12. See FIG. 8.

Figure 9:
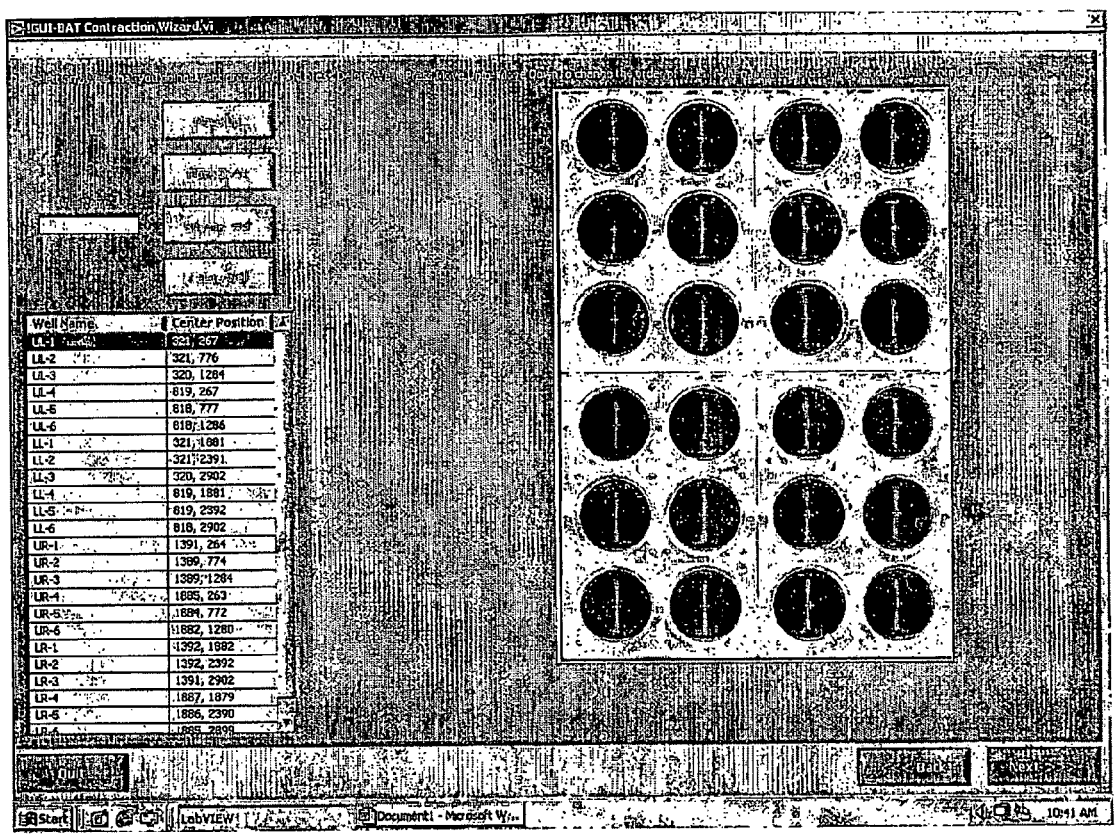
FIG. 9 is a screen shot of a further step in a computer-implemented method of obtaining and analyzing images of tissue engineered constructs according to the present invention, the screen shot illustrating one preferred and non-limiting embodiment of this method.
Figure 10:
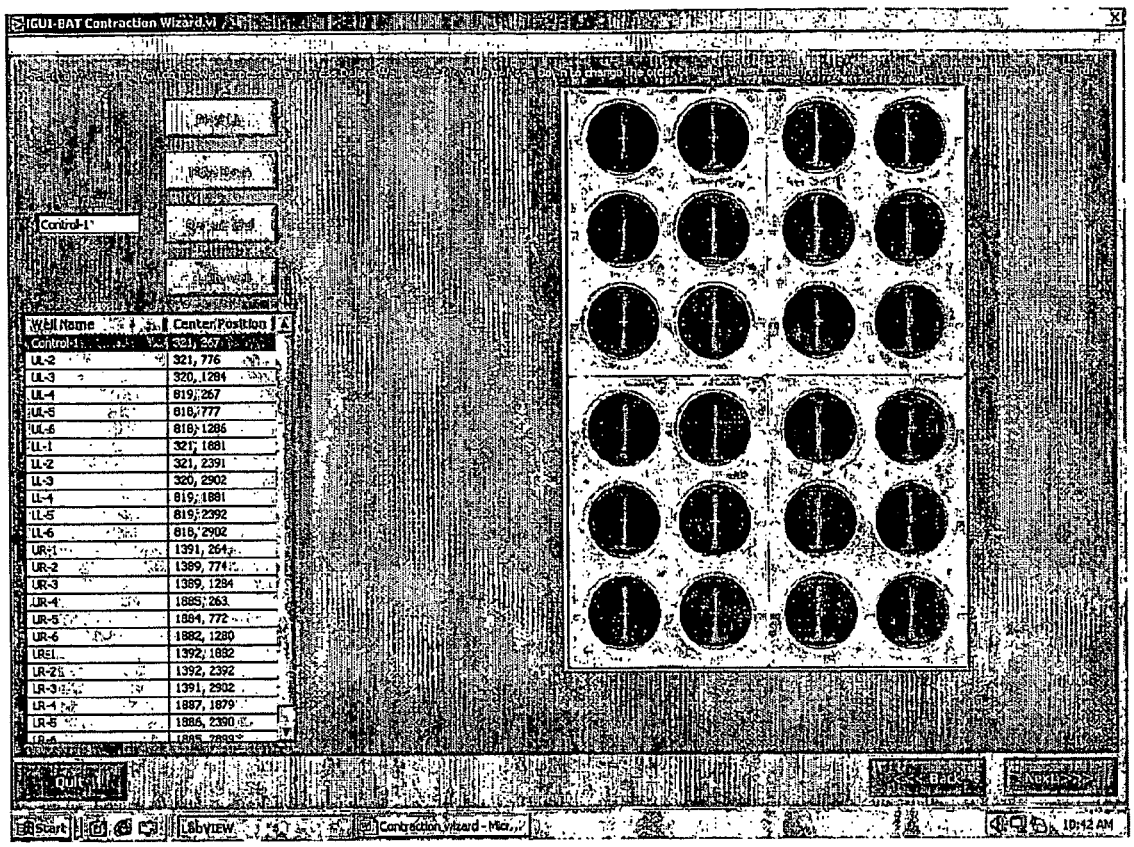
FIG. 10 is a screen shot of a further step in a computer-implemented method of obtaining and analyzing images of tissue engineered constructs according to the present invention, the screen shot illustrating one preferred and non-limiting embodiment of this method.
Figure 11:
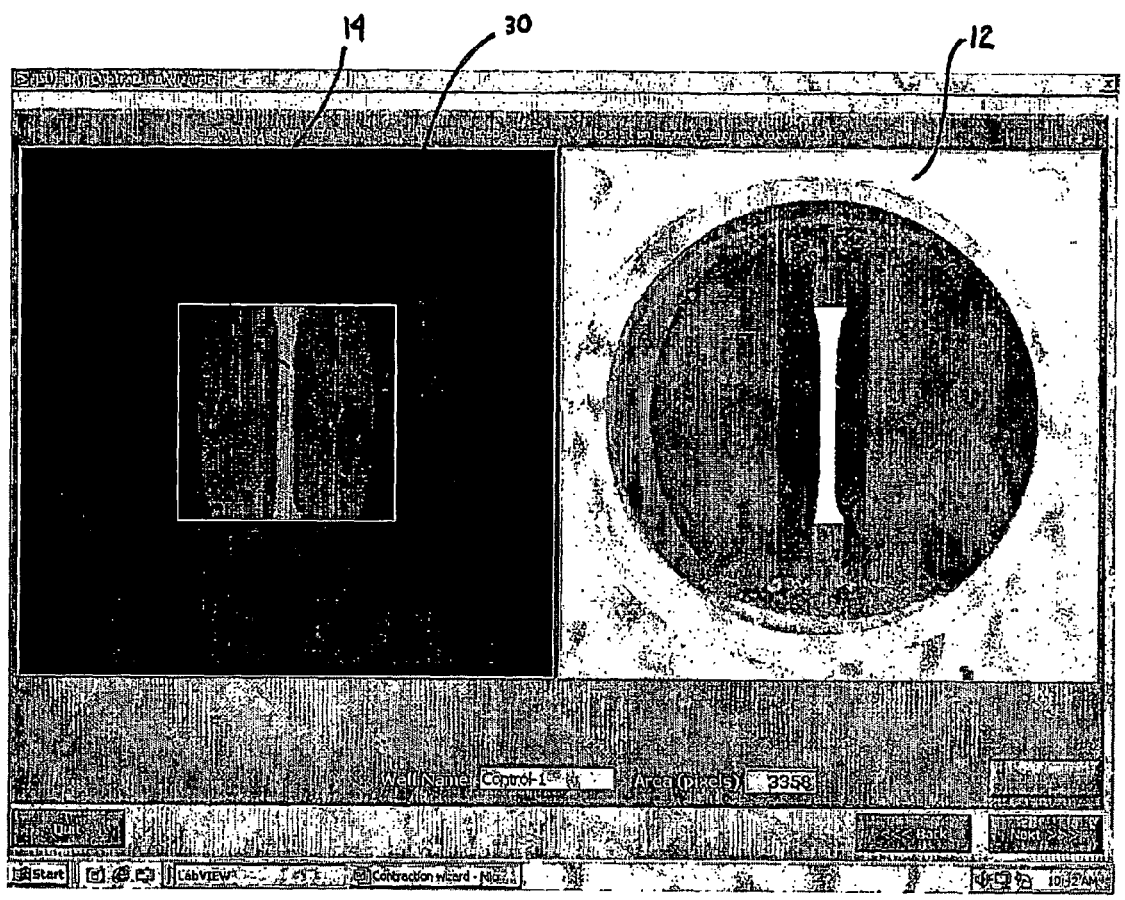
FIG. 11 is a screen shot of a further step in a computer-implemented method of obtaining and analyzing images of tissue engineered constructs according to the present invention, the screen shot illustrating one preferred and non-limiting embodiment of this method.
Figure 12:
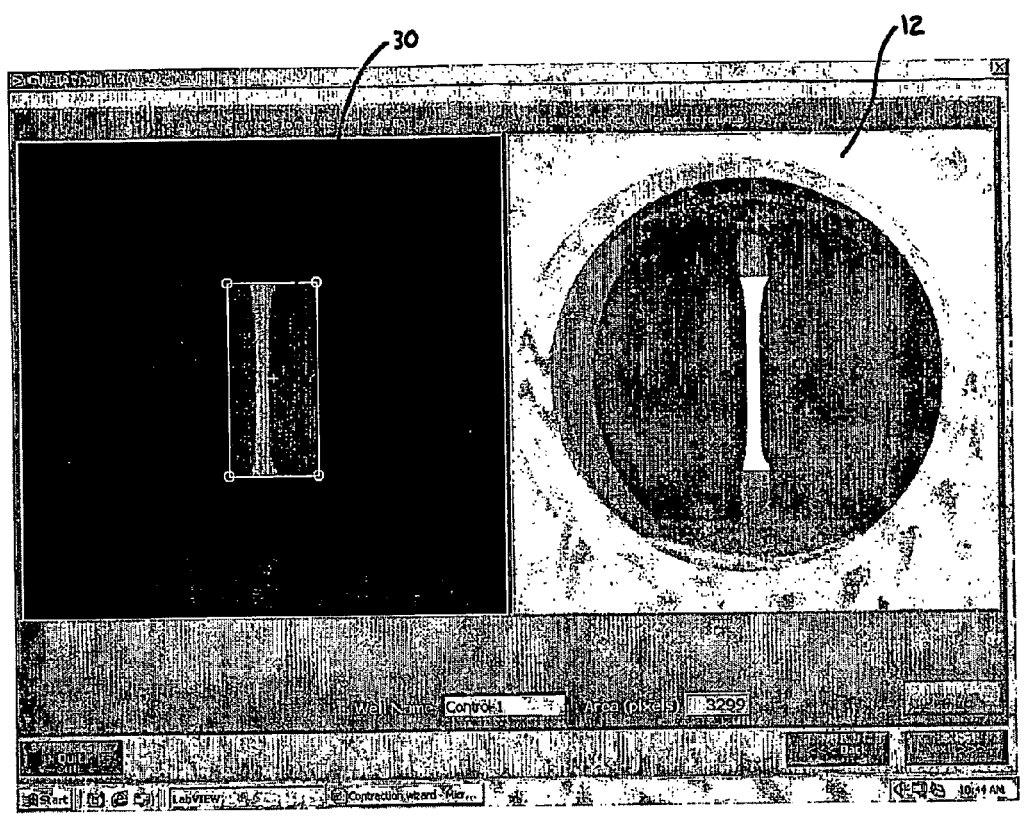
FIG. 12 is a screen shot of a further step in a computer-implemented method of obtaining and analyzing images of tissue engineered constructs according to the present invention, the screen shot illustrating one preferred and non-limiting embodiment of this method.

FIGS. 9 and 10, the user may rename the wells 12 and/or change the well 12 order as desired. In this example, the well name "UL-1", which stands for upper left 1, is changed to "Control-1." Accordingly, this is the control well 12. After renaming the wells 12, the user may further refine the bioartificial tissue 14 identification, or when calculating the area, the bioartificial tissue area, manually by adjusting the rectangle frame. As seen in FIG. 11, the rectangle frame on the left may be adjusted to remove glare, other contaminants, etc. from the well area of interest 28 or construct area of interest 30. This modification or manipulation can be accomplished before the measurements occur, during the monitoring process, after the measurements or monitoring process, etc. Due to the imaging anomalies in the construct area of interest 30 in the culture well in FIG. 11, the user can narrow the well area of interest 28 and/or the construct area of interest 30 to remove these anomalies. See FIG. 12.

Figure 13:
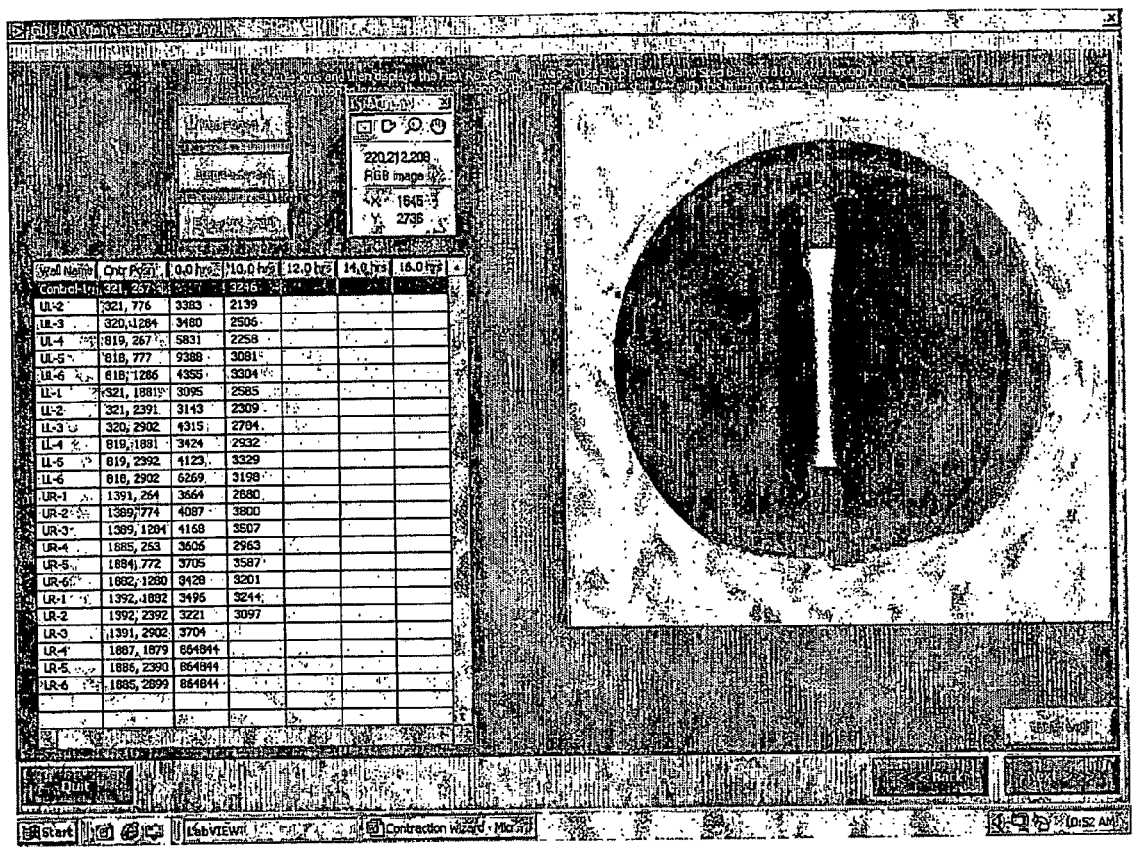
FIG. 13 is a screen shot of a further step in a computer-implemented method of obtaining and analyzing images of tissue engineered constructs according to the present invention, the screen shot illustrating one preferred and non-limiting embodiment of this method.
Figure 14:
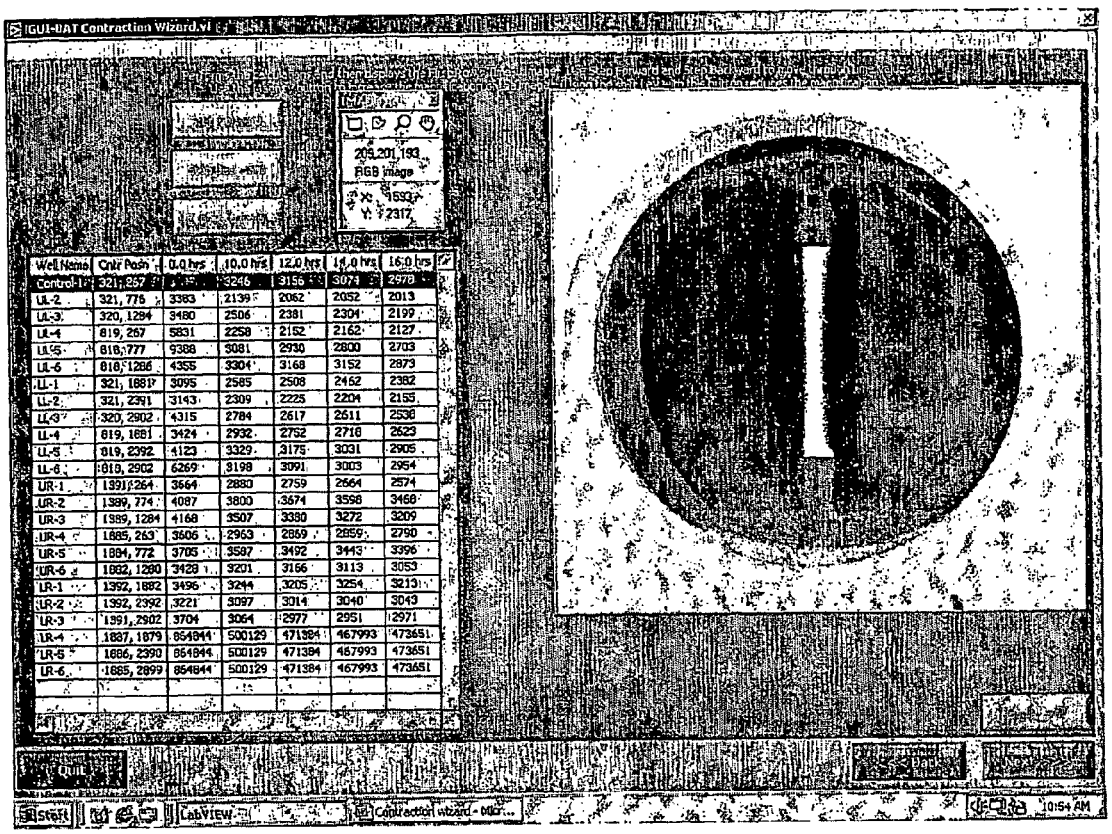
FIG. 14 is a screen shot of a further step in a computer-implemented method of obtaining and analyzing images of tissue engineered constructs according to the present invention, the screen shot illustrating one preferred and non-limiting embodiment of this method.

When the parameter of interest is the area of the bioartificial tissue 14, as in this example, the program or computer controller 20 will automatically find the bioartificial tissue 14 area in each image file and provide this information to the user in a raw data form. In addition, as seen in FIG. 13, the digital image of the bioartificial tissue 14 is overlaid with pixels, such that the user can easily ascertain what the computer controller 20 considers as the area of the bioartificial tissue 14.

Figure 15:
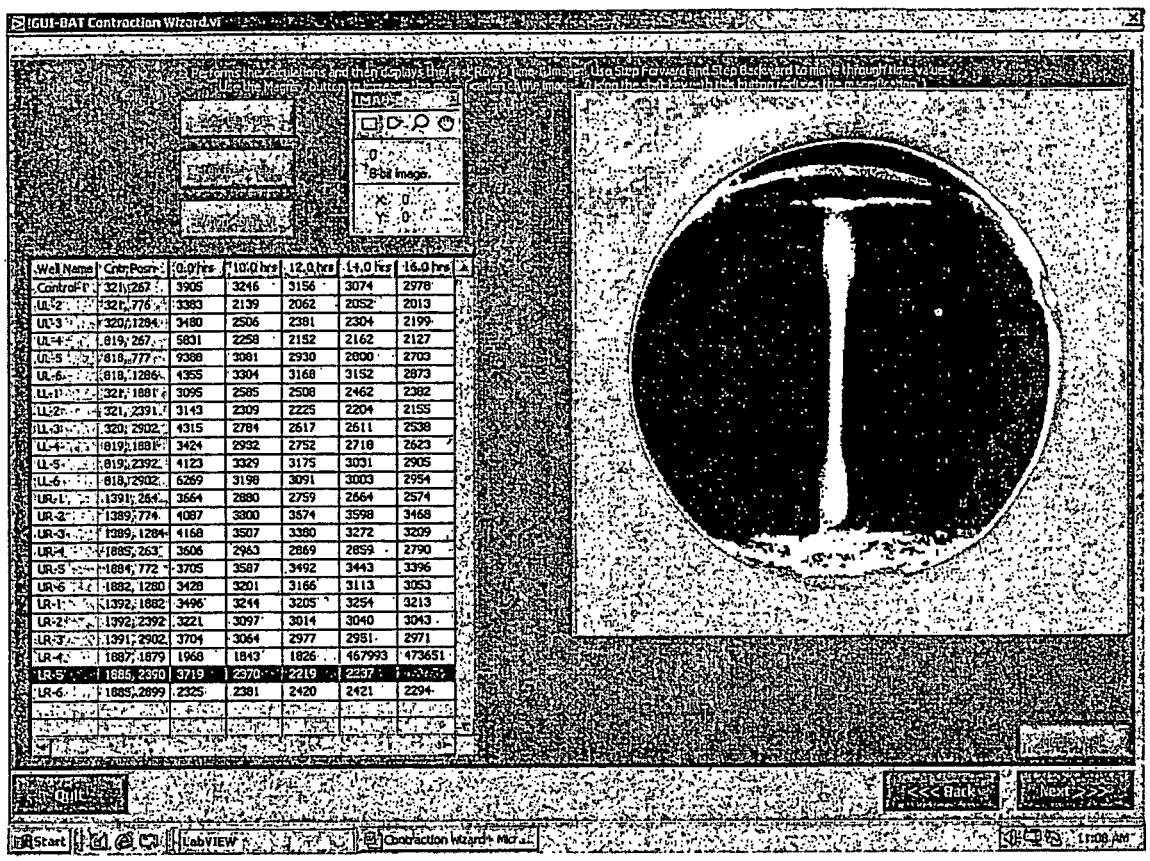
FIG. 15 is a screen shot of a further step in a computer-implemented method of obtaining and analyzing images of tissue engineered constructs according to the present invention, the screen shot illustrating one preferred and non-limiting embodiment of this method.
Figure 16:
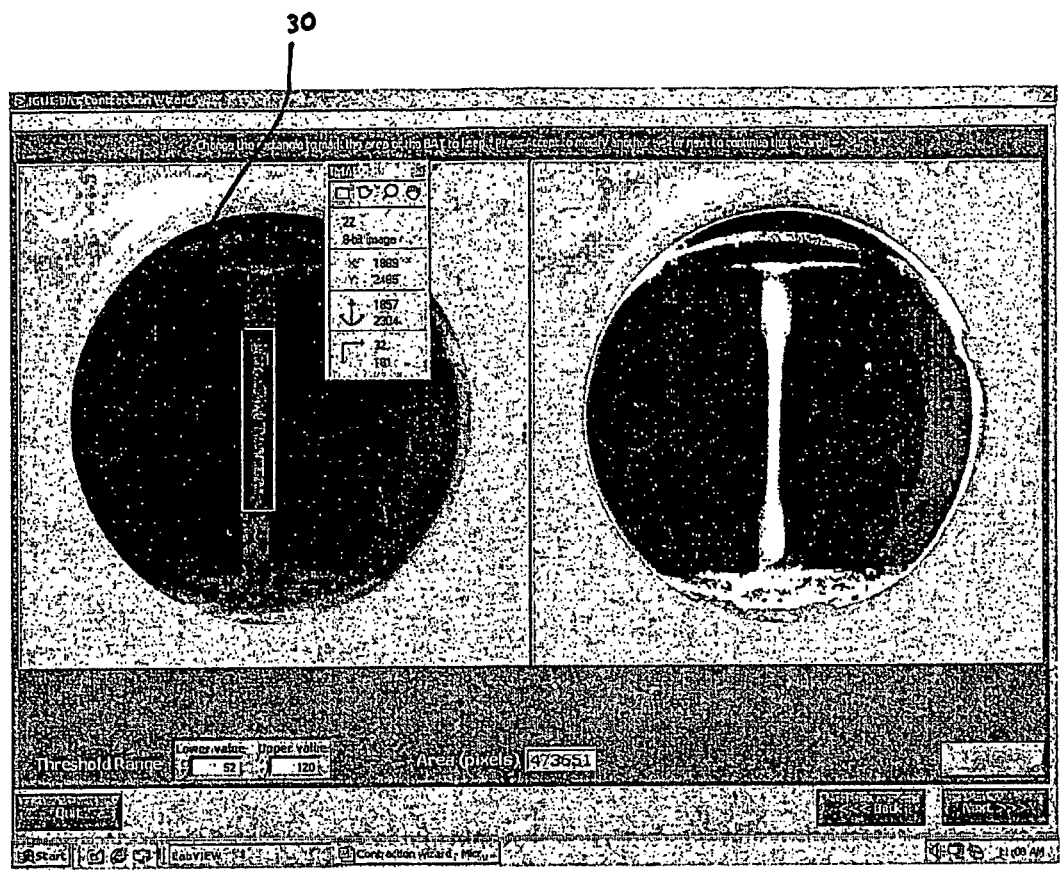
FIG. 16 is a screen shot of a further step in a computer-implemented method of obtaining and analyzing images of tissue engineered constructs according to the present invention, the screen shot illustrating one preferred and non-limiting embodiment of this method.
Figure 17:
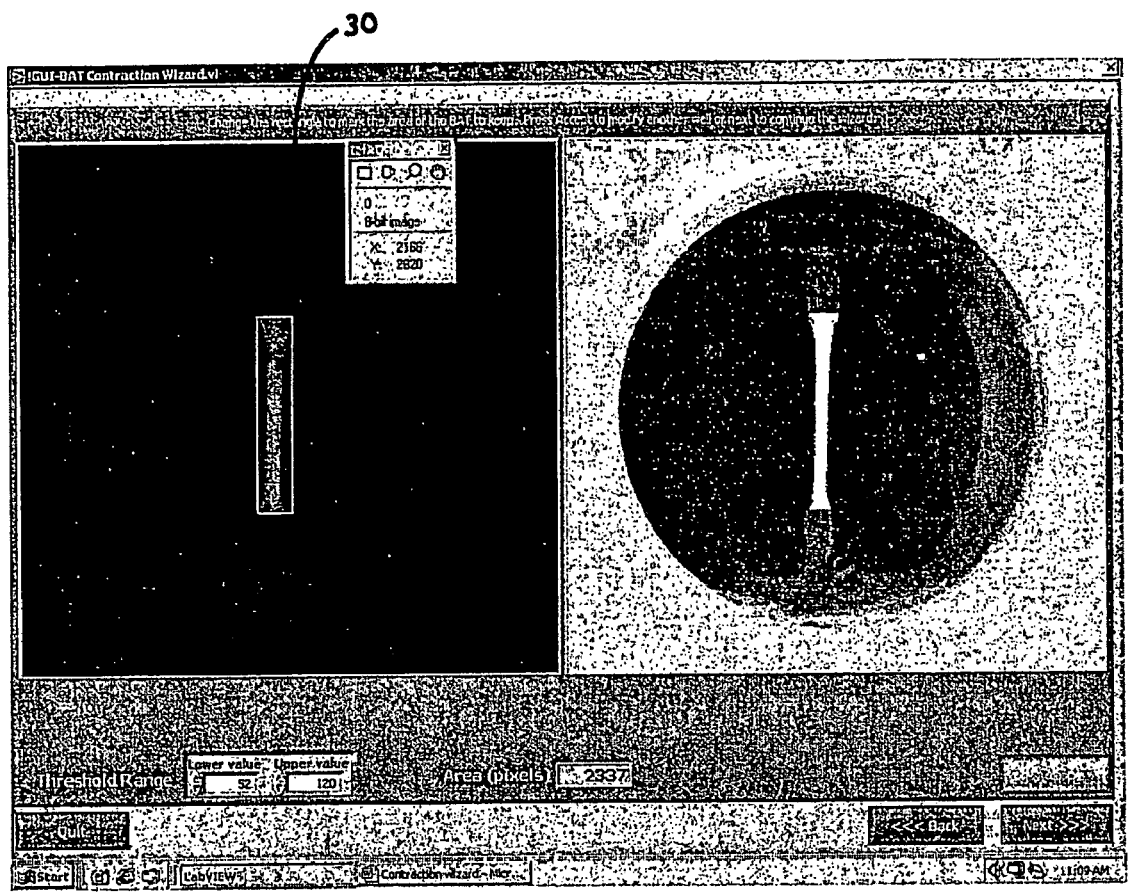
FIG. 17 is a screen shot of a further step in a computer-implemented method of obtaining and analyzing images of tissue engineered constructs according to the present invention, the screen shot illustrating one preferred and non-limiting embodiment of this method.
Figure 18:
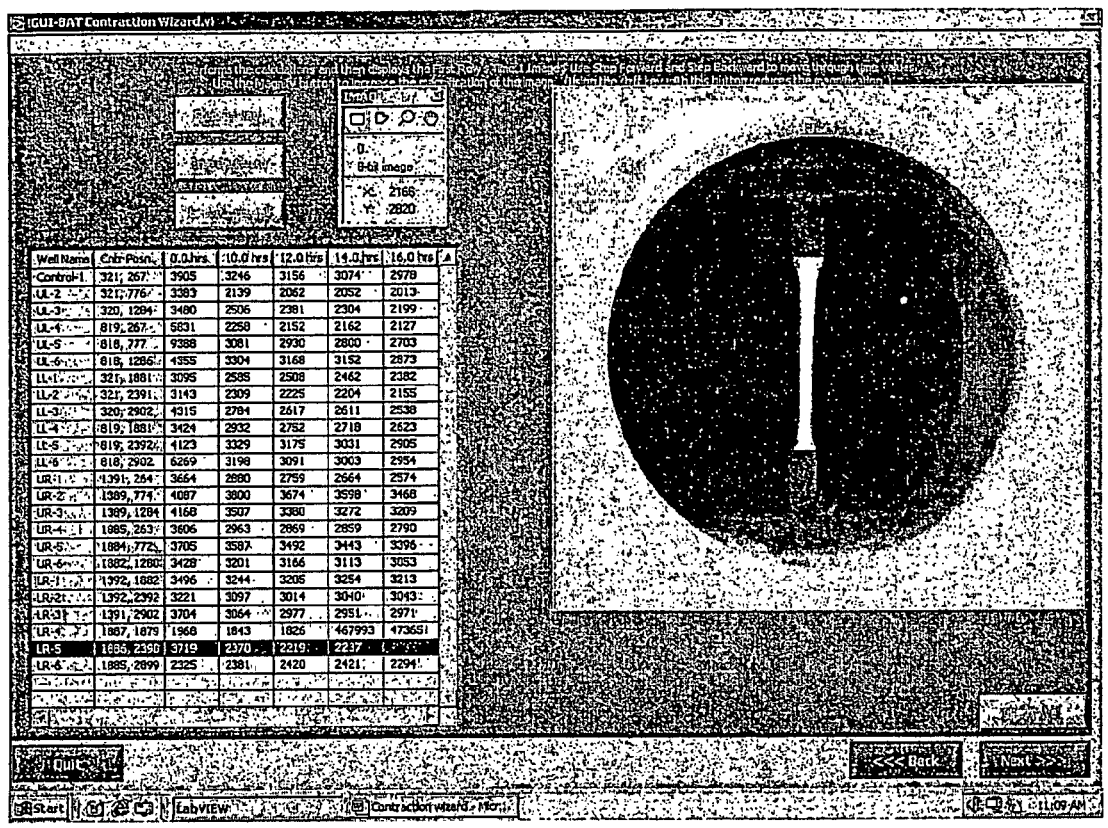
FIG. 18 is a screen shot of a further step in a computer-implemented method of obtaining and analyzing images of tissue engineered constructs according to the present invention, the screen shot illustrating one preferred and non-limiting embodiment of this method.
Figure 19:
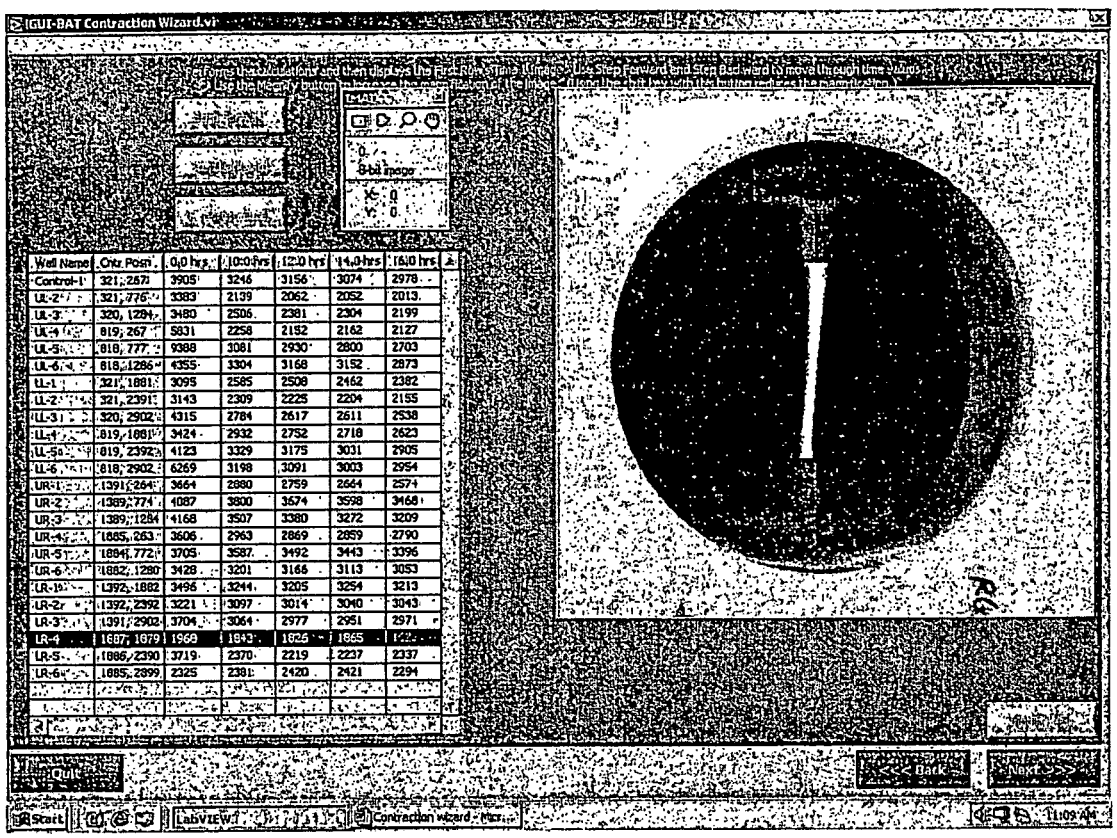
FIG. 19 is a screen shot of a further step in a computer-implemented method of obtaining and analyzing images of tissue engineered constructs according to the present invention, the screen shot illustrating one preferred and non-limiting embodiment of this method.

After measuring is complete, it is possible that there could be some inconsistencies in the data. For example, in FIG. 14, wells LR-4, LR-5 and LR-6 indicate areas that cannot be correct. Therefore, the user can highlight the number and/or well 12 by clicking the well name and selecting the well 12 to determine the various areas calculated over the various time points. In FIG. 15, it is evident that well LR-5, at the 16-hour time point, is identified as having a substantially larger area of bioartificial tissue 14 than is illustrated in the "non-overlaid" image. Therefore, and as seen in FIG. 16, by clicking the "modify well" button, a digital image will appear on the left, and the user may then manipulate the well area of interest 28 and/or the construct area of interest 30, and allow the program to recalculate the area. The recalculation provides a more accurate determination of the area, as is seen in FIG. 17. Therefore, the bioartificial tissue 14 area is changed from 473651 to 2337, which is a more reasonable number. See FIG. 18.

Figure 20:
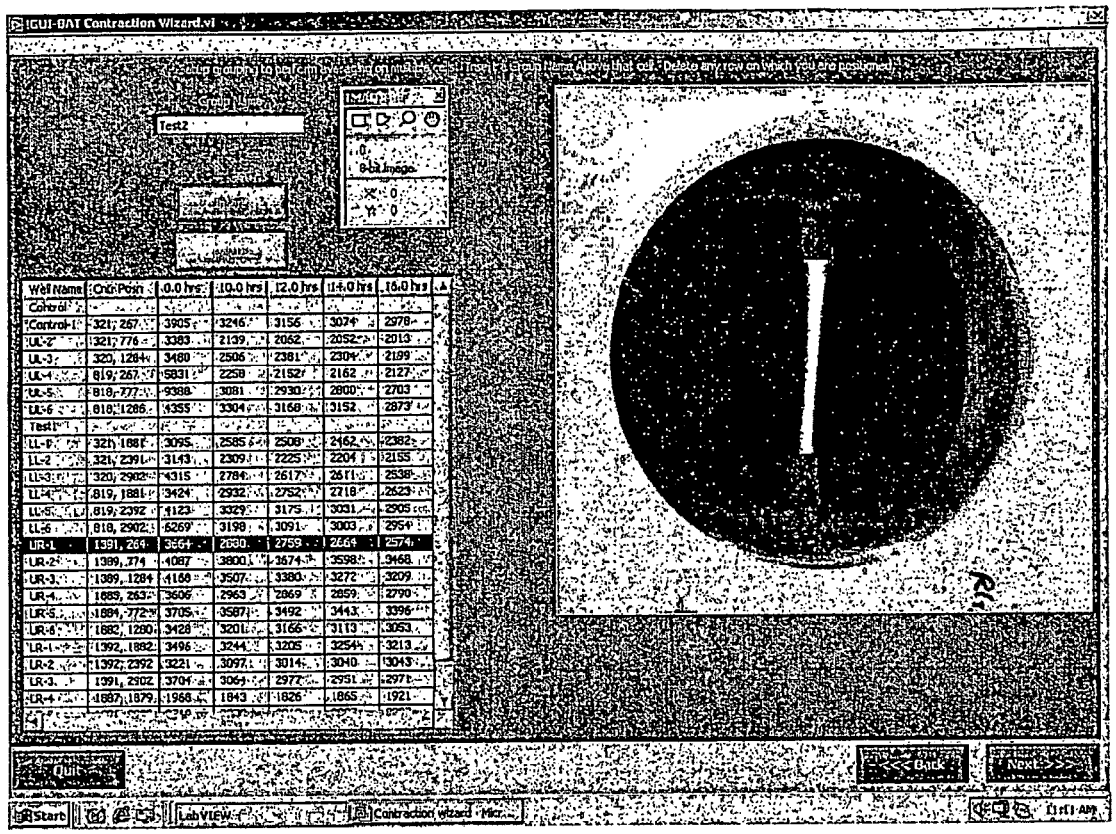
FIG. 20 is a screen shot of a further step in a computer-implemented method of obtaining and analyzing images of tissue engineered constructs according to the present invention, the screen shot illustrating one preferred and non-limiting embodiment of this method.
Figure 21:
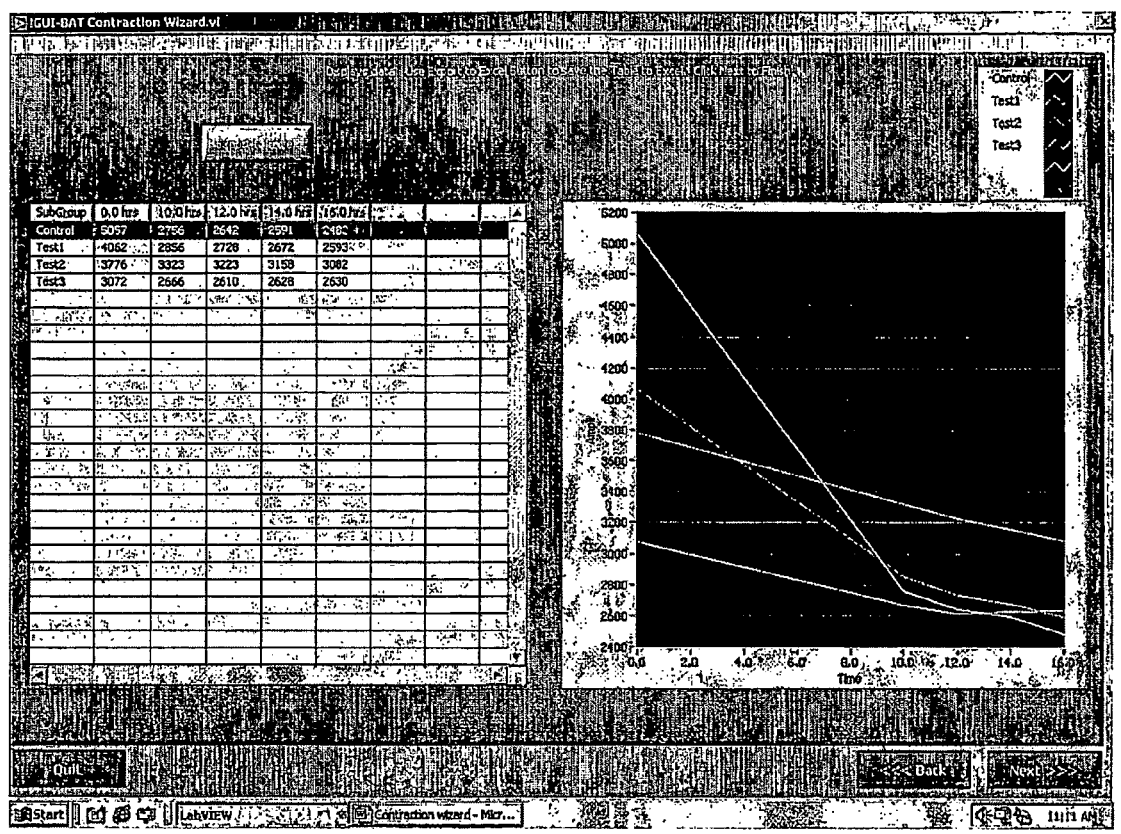
FIG. 21 is a screen shot of a further step in a computer-implemented method of obtaining and analyzing images of tissue engineered constructs according to the present invention, the screen shot illustrating one preferred and non-limiting embodiment of this method.
Figure 22:
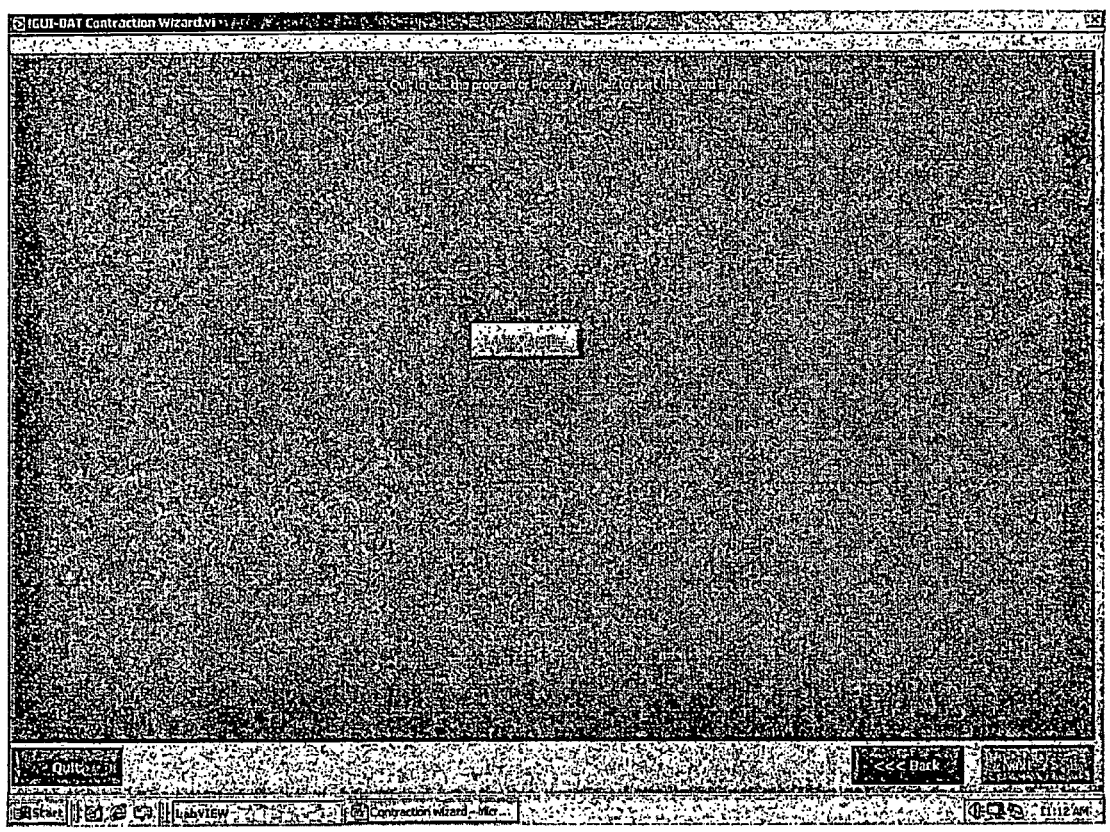
FIG. 22 is a screen shot of a further step in a computer-implemented method of obtaining and analyzing images of tissue engineered constructs according to the present invention, the screen shot illustrating one preferred and non-limiting embodiment of this method.

After the data is checked and modified, this data then may be exported into a subsequent program for analysis. However, the computer controller 20 and program executable thereon may also include the appropriate software analytical tools to accomplish any desired analytical function. In FIG. 20, various groups are selected and uniquely identified, and in FIG. 21, the data is plotted, in this case illustrating a contraction curve of the average of each group. This data may be displayed, saved, exported, etc. Finally, FIG. 22 illustrates the end of the process, as well as the option to process another group of culture wells 12.

The above example illustrates a system 10, wherein the imaging device 18 is a scanner, and the culture wells 12 were placed on the scanner glass. In order to appropriately identify the bioartificial tissue 14 in the culture well 12, the contrast settings of the scanner were manipulated in order to achieve optimal scanning. However, any means of achieving optimal resolution and identification of the test subject is envisioned. In addition, any type of bioartificial tissue 14 may be monitored, and various analytical properties and parameters may be determined based upon the captured data. Accordingly, the present invention is not limited to calculating the area of bioartificial tissue 14, and instead includes the capture of data and signals that allow for a variety of analytics to be performed.

In this manner, the present invention provides a system and computer-implemented method that allows for the imaging of tissue engineered constructs in the wells 12, while the wells 12 are located in the incubator apparatus 16 or other enclosed environment. Therefore, the tissue engineered constructs and the wells 12 are not subject to repeated external exposure or removal from the controlled environment of the incubator and dramatic environmental changes. In addition, the present system 10 and computer-implemented method allow for an automated procedure to collect and analyze data regarding this tissue engineered construct.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A tissue engineered construct analytical imaging system for use in connection with at least one culture well having a tissue engineered construct therein and positionable in an enclosed environment, the system comprising:
   an imaging device positioned within the enclosed environment and configured to obtain three-dimensional image data reflective of at least a portion of the tissue engineered construct in a well area of interest in the at least one culture well, without the removal of at least one of the tissue engineered construct and the culture well from the enclosed environment; and
   a computer controller configured to at least one of
      (i) receive data from the imaging device;
      (ii) analyze the data for determining at least one of the following: matrix organization, matrix compaction, matrix contraction, or any combination thereof; and
      (iii) output data reflecting results of an analysis;
   wherein the tissue engineered construct is at least one of the following: a bioartificial cellular tissue construct, bioartificial tissue, and a bioartificial tendon.

2. The system of claim 1, wherein the imaging device is at least one of a camera, a digital camera, a scanner, a scanning device, a plurality of cameras, a video camera, a digital video camera and a device capable of capturing an image.

3. The system of claim 1, wherein the computer controller is at least one of a computing device, a computer, a personal computer, a controller, a circuit board, a laptop, a personal digital assistant, a networked computer and a server.

4. The system of claim 1, wherein the computer controller is further configured to control a mechanical loading mechanism for loading the tissue engineered construct.

5. The system of claim 1, wherein the at least one culture well is positionable upon the imaging device.

6. The system of claim 1, wherein the computer controller is further configured to at least one of expand, contract, manipulate, modify, or any combination thereof, the well area of interest.

7. The system of claim 1, wherein data reflecting a plurality of well areas of interest are obtained by the imaging device.

8. The system of claim 1, wherein data reflective of a plurality of well areas of interest are obtained by the imaging device for a respective plurality of culture wells positioned within the enclosed environment.

9. The system of claim 1, further comprising a storage device in communication with the computer controller and configured to store at least one of the following: data, image data, well culture data, well area of interest data, construct area of interest data, incubator data, parameter data, digital input data, analog input data, or any combination thereof.

10. The system of claim 1, further comprising an input device in communication with the computer controller and configured to transmit user input commands to the computer controller.

11. The system of claim 1, further comprising a display device in communication with the computer controller and configured to display at least one of the following: data, image data, well culture data, well area of interest data, construct area of interest data, incubator data, parameter data, digital input data, analog input data, user input data, graphical data, analytical results, images, or any combination thereof.

12. The system of claim 1, wherein, after the data are obtained by the imaging device and received by the computer controller, a user can manipulate at least one of the well area of interest and a construct area of interest for use in further data collection for at least one well culture.

13. The system of claim 1, wherein the computer controller is further configured to uniquely identify a culture well in a plurality of culture wells.

14. The system of claim 1, wherein the well area of interest includes a construct area of interest, and wherein the desired parameter analyzed is the area of the tissue engineered construct within the construct area of interest.

15. The system of claim 1, wherein the tissue engineered construct is cells cultured in a three-dimensional collagen gel.

16. The system of claim 1, wherein the tissue engineered construct is anchored within the culture well on at least two ends thereof.

17. A computer-implemented method of obtaining and analyzing images of a tissue engineered construct, the method comprising:
   (a) positioning at least one culture well having the tissue engineered construct therein in an enclosed environment;
   (b) obtaining, from an imaging device positioned within the enclosed environment, three-dimensional image data reflective of at least a portion of the tissue engineered construct in a well area of interest in at least one culture well, without the removal of at least one of the tissue engineered construct and the culture well from the enclosed environment, and wherein the tissue engineered construct is at least one of the following: a bioartificial cellular tissue construct, bioartificial tissue, and a bioartificial tendon;
   (c) analyzing the three-dimensional image; and
   (d) determining at least one of the following: matrix organization, matrix compaction, matrix contraction, or any combination thereof.

18. The method of claim 17, further comprising receiving the data reflective of the well area of interest.

19. The method of claim 17, further comprising outputting data reflecting results of the analysis.

20. The method of claim 17, further comprising controlling a mechanical loading mechanism for loading the tissue engineered construct.

21. The method of claim 17, further comprising at least one of the following: expanding, contracting, manipulating, modifying, or any combination thereof, the well area of interest.

22. The method of claim 17, further comprising obtaining data reflecting a plurality of well areas of interest.

23. The method of claim 17, further comprising obtaining data reflective of a plurality of well areas of interest for a respective plurality of culture wells positioned within the enclosed environment.

24. The method of claim 17, further comprising displaying at least one of the following: data, image data, well culture data, stored data, well area of interest data, construct area of interest data, incubator data, parameter data, digital input data, analog input data, user input data, graphical data, analytical results, images, or any combination thereof.

25. The method of claim 17, wherein, after the data are obtained, the method further comprising manipulating at least one of the well areas of interest and a construct area of interest for use in further data collection for at least one well culture.

26. The method of claim 17, further comprising uniquely identifying a culture well in a plurality of culture wells.

27. The method of claim 17, wherein, prior to positioning at least one culture well in the enclosed environment, the method further comprises anchoring the tissue engineered construct within the culture well on at least two ends thereof.

28. The method of claim 17, wherein the data reflective of the well area of interest is at least one of the following: imaging data, visual data, visible light data, infrared data, ultraviolet data, magnetic resonance engineering data, computer tomography data, radiation data, x-ray data, or any combination thereof.

29. The method of claim 17, wherein the data are digital images, the method further comprising pre-defining the desired resolution of the digital images.

30. A tissue engineered construct imaging and analysis apparatus for use in connection with at least one culture well having tissue engineered constructs therein and positionable in an enclosed environment, the apparatus comprising:
  imaging means positionable in the enclosed environment and for obtaining three-dimensional image data reflective of at least a portion of the tissue engineered construct in a well area of interest in the at least one culture well, without the removal of the culture well from the enclosed environment, and wherein the tissue engineered construct is at least one of the following: a bioartificial cellular tissue construct, bioartificial tissue, and a bioartificial tendon; and
  computing means for receiving and analyzing the three-dimensional data, and determining at least one of the following: matrix organization, matrix compaction, matrix contraction, or any combination thereof.

31. A tissue engineered construct analytical imaging system for use in connection with at least one culture well having a tissue engineered construct therein and positionable in an enclosed environment, the system comprising:
  an imaging device positioned within the enclosed environment and configured to obtain three-dimensional image data reflective of at least a portion of the tissue engineered construct in a well area of interest in the at least one culture well, without the removal of the culture well from the enclosed environment, wherein the tissue engineered construct is anchored on at least two edges thereof;
  a mechanical loading mechanism configured to apply a load to the tissue engineered construct; and
  a computer controller configured to:
    (i) receive data from the imaging device;
    (ii) analyze the data and determine at least one of the following: matrix organization, matrix compaction, matrix contraction, or any combination thereof; and
    (iii) output data reflecting results of the analysis.

32. A computer-implemented method of obtaining and analyzing images of a tissue engineered construct, the method comprising:
  (a) positioning at least one culture well having the tissue engineered construct therein in an enclosed environment;
  (b) anchoring the tissue engineered construct on at least two edges thereof;
  (c) applying a load to the tissue engineered construct;
  (d) obtaining three-dimensional image data reflective of at least a portion of the tissue engineered construct in a well area of interest in the at least one culture well, without the removal of the culture well from the enclosed environment;
  (e) analyzing the three-dimensional data; and
  (f) determining at least one of the following: matrix organization, matrix compaction, matrix contraction, or any combination thereof.

33. A tissue engineered construct imaging and analysis apparatus for use in connection with at least one culture well having tissue engineered constructs therein and positionable in an enclosed environment, the apparatus comprising:
  imaging means positionable in the enclosed environment and for obtaining three-dimensional image data reflective of at least a portion of the tissue engineered construct in a well area of interest in the at least one culture well, without the removal of at least one of the tissue engineered construct and the culture well from the enclosed environment, wherein the tissue engineered construct is anchored on at least two edges thereof;
  loading means for applying a load to the tissue engineered construct; and
  computing means for receiving and analyzing the three-dimensional data, and determining at least one of the following: matrix organization, matrix compaction, matrix contraction, or any combination thereof.

* * * * *